United States Patent Office 2,987,046
Patented June 6, 1961

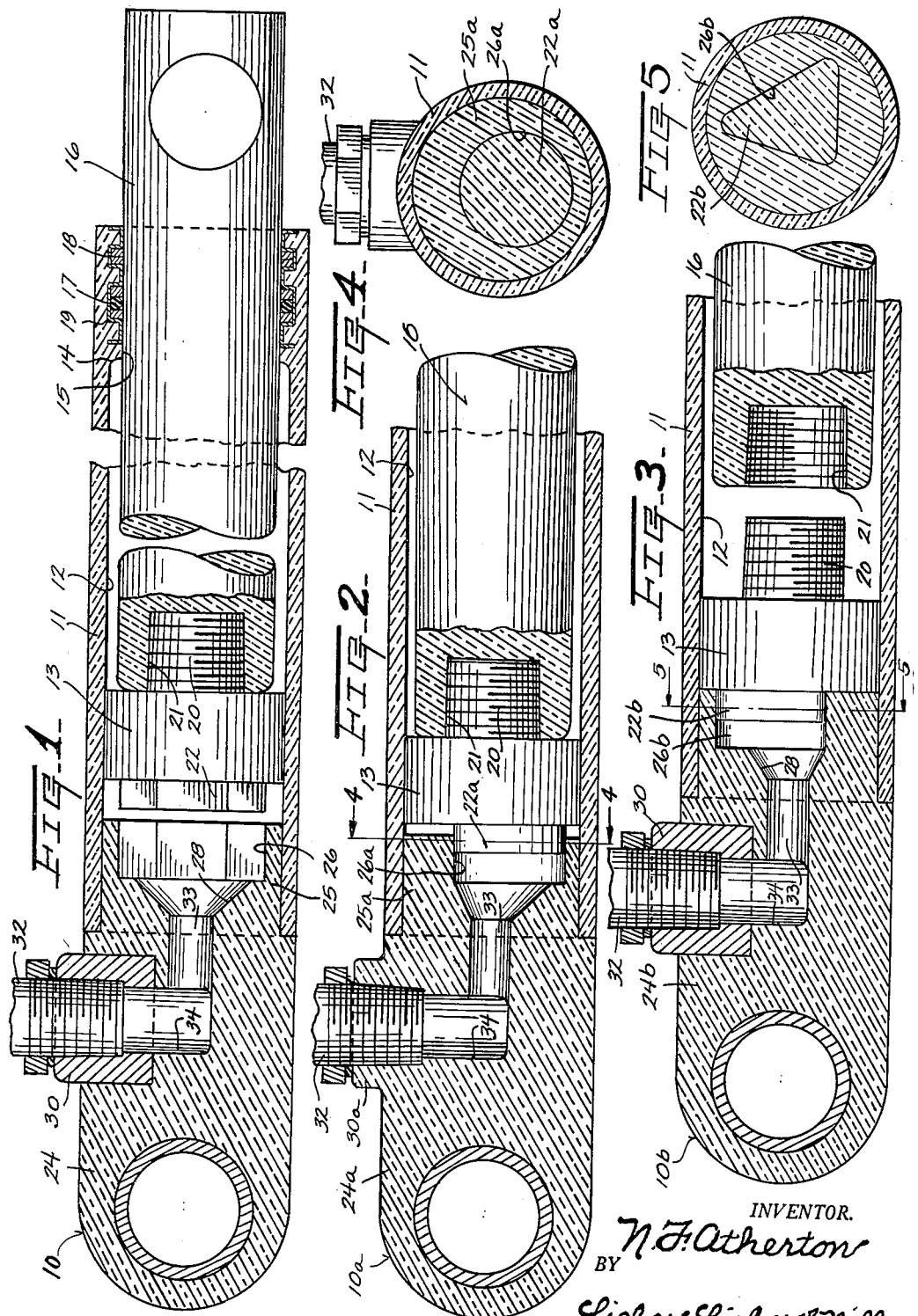

2,987,046
RAM ASSEMBLAGE
Neil F. Atherton, Bayside, Wis., assignor to Blackhawk Mfg. Co., West Allis, Wis., a corporation of Wisconsin
Filed June 6, 1958, Ser. No. 740,271
9 Claims. (Cl. 121—38)

This invention relates generally to hydraulic rams and more particularly to an improved cylinder and piston construction and means for assembly and disassembly thereof. This invention finds particular utility in expendable or "throw-away" jacks, or the like.

Fluid motor units of the above type must be produced economically and consequently must be produced with as few manufacturing operations and parts as possible. Heretofore, in order to disassemble and assemble the unit for replacing its seals for example, it was necessary to make the cylinder of separable members to permit removal of the piston rod. By making the cylinder of at least two detachable parts, the additional joints which resulted further added to the cost and service problems by themselves requiring sealing means to prevent leakage.

Accordingly, the present invention provides a cylinder and piston unit in which the finished cylinder is formed as a single member and need not be take apart to replace the seals between the piston rod and cylinder. The invention further contemplates that the piston rod may be removed from its piston without removing the latter from the cylinder.

More specifically, the invention provides a cylinder construction for a hydraulic ram in which one end of the cylinder has a permanently attached head that contains the pressure fluid passageway and also contains a portion for holding the piston against rotation within the cylinder to permit detachment of the piston from its rod. The other end of the cylinder is of such a size as to form a sliding fit with the piston rod and carries sealing means therebetween. This rod end of the cylinder is formed as an integral part thereof and through which the piston cannot be removed.

These and other objects and advantages will appear later as this disclosure progresses, reference being had to the accompanying drawings, in which:

FIGURE 1 is a longitudinal sectional view of a ram assembly made in accordance with the present invention, with certain parts being broken away for clarity;

FIGURE 2 is a view generally similar to FIGURE 1 but showing a modified form of cylinder head and piston, and also showing the piston partially engaged by the head;

FIGURE 3 is a view generally similar to FIGURE 1, but showing the piston fully engaged by the cylinder head to prevent rotation of the piston, showing the rod removed from the piston, and showing a modified form of head and piston holding connection;

FIGURE 4 is a transverse cross-sectional view taken on line 4—4 of FIGURE 2; and FIGURE 5 is a transverse cross-sectional view taken on line 5—5 in FIGURE 3.

Referring in greater detail to the drawings, the cylinder assembly 10 is comprised of a tubular portion 11 having a bore 12 in which the piston 13 reciprocates. The bore 12 terminates at 14 where it is joined with the bore 15 of smaller diameter. It will be noted that the piston 13 is of a larger diameter than the bore 15 and consequently cannot be withdrawn from that end of the cylinder. Bore 15 snugly receives the piston rod 16 for reciprocation therein. Leakage between the rod and bore 15 is prevented by the seals 17 and 18 carried in the ring 19.

The ring 19 is permanently fixed in the bore 15 as by having the portion 11 formed integrally therewith, for example, by casting or molding the material 11 around the ring.

One side of the piston has a threaded stud 20 which engages the internal thread 21 in the end of the piston rod. The other side of the piston has a portion 22 formed integrally thereon, which portion may be non-circular or eccentric with respect to the axis of the assembly. In the embodiment shown in FIGURE 1, the cross-sectional shape of this portion is hexagonal, while the device of FIGURES 2 and 4 is circular in shape but eccentrically located in respect to the assembly axis. FIGURES 3 and 5 illustrate still another modification having interengaging portions between the piston and cylinder of non-circular cross-section and non-symmetrical with respect to the cylinder axis, for purposes that will appear later.

The cylinder 10 also includes a head 24 having an end portion 25 that tightly fits into the tubular portion 11 and is permanently secured therein.

The invention has been illustrated as being made of non-metallic material such as a plastic which contributes to an assembly of economical design. If a plastic material is used for the tubular portion 11 and the head 24, then a mastic, such as a plastic cement, is used therebetween to securely bond them together and form a tight leakproof seal. If a metal such as steel is used for these parts, then they would be secured together as by welding, or the like. In any event, the head is securely and permanently fastened to the tubular portion and forms an integral unit therewith.

As shown in FIGURE 1, the inner end of the cylinder head has a recess 26 which is complementary to the piston part 22. Part 22 and recess 26 have been shown in FIGURE 1 as being hexagonal in cross-section but, as mentioned, other non-circular or eccentrically located shapes may be utilized for these parts such as shown in FIGURES 2 to 5.

It will be noted that the piston end 22b and head recess 26b shown in the cylinder assembly 10b of FIGURES 3 and 5 are non-symmetrical about the piston axis and can be engaged only when the piston is in one certain position relative to the head 24b. This particular construction has proved to be advantageous because the piston end will not enter its recess, when the unit is collapsed, except when the piston end and recess are in registry. Thus, in the majority of unit contracted positions, the entire head end of the piston will be exposed to fluid pressure when the latter is admitted to the cylinder to thereby insure a positive and full power stroke of the unit even at the initial portion of the expansion stroke.

The device of FIGURES 2 and 4 functions similarly to the FIGURE 3 device in preventing bottoming of the pison in the cylinder, except when the eccentrically located circular portion 22a is in alignment or registry with its complementary recess 26a in the cylinder head.

The fluid passageway formed in the head is comprised of a funnel-shaped passage 28 which diverges into the bore 12, more particularly, into the recess 26. Thus a substantial area of the piston is exposed to fluid pressure even if the piston is bottomed in the non-circular recess.

FIGURE 1 shows a steel boss or insert 30 around which the head 24 has been cast to form a unitary structure therewith. In the modified cylinder assembly 10a shown in FIGURE 2, the boss 30a is formed integrally with the head and is cast as a single piece. In either case, the boss is tapped to receive the threaded end of the pressure fluid conduit 32 which communicates with the flared passage 28 by means of the axial passage 33 and the radially extending passage 34.

Before the head 24 is permanently secured to the tubular portion 11, the seals 17 and 18 have been placed in the ring 19. The piston is then inserted in the cylinder and the rod 16 is inserted in the bore 15 and threaded to the piston. The head may then be fixed to the tubular portion 11.

When it is necessary to replace seals 17 and 18, the piston rod is turned and the unit is contracted until the non-circular or eccentrically located portion of the piston and engages its complementary recess in the cylinder head. The piston is thereby prevented from rotating and the rod may be unthreaded therefrom and withdrawn from the cylinder. The flexible seals are then exposed and may be readily replaced by a suitable tool after which the rod is then inserted in the cylinder and threadably engaged on the piston.

The device shown in FIGURES 2 and 4 has proved to be particularly desirable, because the torque developed when tightening or loosening the rod 16 in respect to its piston is evenly distributed over the circular mating surfaces. Another advantage of this FIGURE 2 construction lies in the fact that no areas of concentrated load are developed between the head and the projecting piston portion when the complementary portions are almost in registry and a load is imposed on the unit in a contracting direction. In other words, there are no sharp corners of the piston projecting portion which are caused to bear on the cylinder head and support the entire load.

By providing complementary locking means between the interior of the cylinder and the piston, the cylinder may be made as a single piece and need not be disassembled in order to remove the piston rod for replacing the shaft seals. The rod end of the cylinder may be cast so as to provide a seal supporting portion and through which the piston itself cannot be withdrawn. An economical assembly is provided having a minimum number of parts and seals.

Various modes of carrying out the invention are contemplated as being within the scope of the following claims particularly pointing out and distinctly claiming the subject matter which is regarded as the invention.

I claim:

1. A ram assembly comprising, a cylinder having an integral head at one end, a piston reciprocatingly mounted in said cylinder, and a piston rod threadably engaged at one end to one end of said piston and having its other end extending from said cylinder, said piston at its other end having an engaging portion, said head within said cylinder also having an engaging portion which is complementary to said piston portion for engaging and holding the latter against rotation to thereby permit said rod to be unthreaded from said piston.

2. A ram assembly comprising, a cylinder having an integral head at one end and a seal supporting portion at the other end, a piston reciprocatingly mounted in said cylinder, and a piston rod threadably engaged at one end to one end of said piston and having its other end extending from said cylinder, said piston at its other end having a non-circular portion, said head within said cylinder also having a non-circular portion which is complementary to said piston portion for engaging and holding the latter against rotation, said seal-supporting portion having a bore of less diameter than said piston and with which said rod forms a sliding fit.

3. A ram assembly comprising, a cylinder having an integral head at one end and a seal supporting portion at the other end, a piston reciprocatingly mounted in said cylinder, and a piston rod threadably engaged at one end to one end of said piston and having its other end extending from said cylinder, said piston at its other end having a non-circular projection, said head within said cylinder having a non-circular recess which is complementary to and is adapted to receive said projection to prevent rotation of said piston, said seal-supporting portion having a bore of less diameter than said piston and with which said rod forms a sliding fit.

4. A ram assembly comprising, a cylinder having an integral head at one end, a piston reciprocatingly mounted in said cylinder, and a piston rod threadably engaged at one end to one end of said piston and having its other end extending from said cylinder, the other end of said piston and said head with said cylinder each having a non-circular portion which are complementary to and engageable with one another for holding the piston against rotation, said portions being non-symmetrical about the cylinder axis whereby they are engageable only when in one position relative to one another.

5. A ram assembly comprising, a cylinder having an integral head at one end and a seal supporting portion at the other end, a piston reciprocatingly mounted in said cylinder, and a piston rod threadably engaged at one end to one end of said piston and having its other end extending from said cylinder, the other end of said piston and said head within said cylinder each having a non-circular portion which are complementary to and engageable with one another for holding the piston against rotation, said portions being non-symmetrical about the cylinder axis whereby they are engageable only when in one position relative to one another, said seal-supporting portion having a bore of less diameter than said piston and with which said rod forms a sliding fit.

6. A ram assembly comprising, a cylinder having an integral head at one end, a piston reciprocatingly mounted in said cylinder, and a piston rod threadably engaged at one end to one end of said piston and having its other end extending from said cylinder, said piston at its other end having a non-circular projection, said head within said cylinder having a non-circular recess which is complementary to said piston projection for engaging and holding the latter against rotation, said head also having a pressure fluid passageway which terminates in a flared portion, said flared portion diverging into said recess whereby a substantial area of the piston is presented to pressure fluid when said projection is in said recess.

7. A ram assembly comprising a cylinder having a head and a fluid port at one end, a piston reciprocably mounted in said cylinder, a piston rod threadedly engaged at one end to one end of said piston and having its other end extending from the other end of said cylinder, said piston and said rod being arranged for axial rotation within said cylinder, and means on said head and the other end of said piston cooperating to restrain said piston against axial rotation with respect to said cylinder when said piston is moved to a position adjacent said head whereby when the piston and rod are moved to said position the rod may be unthreaded from said piston and withdrawn from said other end of said cylinder.

8. A ram assembly comprising, a cylinder having an integral head at one end, a piston reciprocably mounted in said cylinder, and a piston rod threadably engaged at one end to one end of said piston and having its other end extending from said cylinder, said piston at its other end having an eccentrically located and circular portion, said head within said cylinder also having an eccentrically located and circular portion which is complementary to said piston portion for engaging and holding the latter against rotation to thereby permit said rod to be unthreaded from said piston.

9. A ram assembly comprising, a cylinder having an integral head at one end and a seal supporting portion at the other end, a piston reciprocatingly mounted in said cylinder, and a piston rod threadably engaged at one end to one end of said piston and having its other end extending from said cylinder, said piston at its other end having an eccentric and circular portion, said head within said cylinder also having an eccentric and circular portion which is complementary to said piston portion for engaging and holding the latter against rotation, said seal-supporting portion having a bore of less diameter than said piston and with which said rod forms a sliding fit.

References Cited in the file of this patent

UNITED STATES PATENTS

| | | |
|---|---|---|
| 1,715,212 | Riggs | May 28, 1929 |
| 2,434,828 | Ashton | Jan. 20, 1948 |
| 2,451,089 | Hunter | Oct. 21, 1948 |
| 2,556,979 | Purcell | June 12, 1951 |
| 2,600,061 | Lord | June 10, 1952 |
| 2,724,368 | Miller | Nov. 22, 1955 |